US010341301B2

(12) United States Patent
Naccache

(10) Patent No.: US 10,341,301 B2
(45) Date of Patent: Jul. 2, 2019

(54) METHOD FOR TRANSMITTING ENCRYPTED DATA, METHOD FOR RECEIVING, CORRESPONDING DEVICES AND COMPUTER PROGRAMS

(71) Applicant: Ingenico Group, Paris (FR)

(72) Inventor: David Naccache, Paris (FR)

(73) Assignee: Ingenico Group, Paris (FR)

( * ) Notice: Subject to any disclaimer, the term of this patent is extended or adjusted under 35 U.S.C. 154(b) by 122 days.

(21) Appl. No.: 15/111,069

(22) PCT Filed: Jan. 16, 2015

(86) PCT No.: PCT/EP2015/050823
§ 371 (c)(1),
(2) Date: Jul. 12, 2016

(87) PCT Pub. No.: WO2015/107175
PCT Pub. Date: Jul. 23, 2015

(65) Prior Publication Data
US 2016/0380980 A1    Dec. 29, 2016

(30) Foreign Application Priority Data

Jan. 17, 2014   (FR) ..................................... 14 50408

(51) Int. Cl.
*H04L 29/06*        (2006.01)
*H04W 12/02*        (2009.01)
(Continued)

(52) U.S. Cl.
CPC ....... *H04L 63/0428* (2013.01); *G06Q 20/327* (2013.01); *G06Q 20/3278* (2013.01);
(Continued)

(58) Field of Classification Search
CPC .................................................. H04L 63/0428
See application file for complete search history.

(56) References Cited

U.S. PATENT DOCUMENTS 6,360,326 B1 *   3/2002   Hiles ..................... G06F 1/3228
                                                          713/323
6,791,997 B2 *   9/2004   Beyer ..................... H04L 45/20
                                                           370/447

(Continued)

FOREIGN PATENT DOCUMENTS

WO        2001/099337 A1    12/2001
WO        2007/001237 A2     1/2007

*Primary Examiner* — Shawnchoy Rahman
(74) *Attorney, Agent, or Firm* — Benoit & Côté Inc.

(57) ABSTRACT

The invention relates to a method for transmitting data from a first terminal, called a sender terminal (TermE), to a second terminal, called a receiver terminal (TermR), the method being characterized in that it comprises:
   a step (100) for obtaining a piece of current time data (DTC);
   a step (110) for determining a piece of transmission time data (DTC) as a function of the piece of current time data (DTC) and at least one predetermined parameter;
   a step (120) for obtaining a piece of data to be encrypted (DaCh) from at least one piece of data to be transmitted (DaTr) and from at least one piece of current time data (DTC);
   a step (130) for encrypting, by means of an encryption key (KeyC), said preliminarily obtained piece of data to be encrypted (DaCh), this step delivering a piece of encrypted data (DCh);
   a step for transmitting said piece of encrypted data (DCh) as a function of said piece of transmission time data (DTT).

8 Claims, 3 Drawing Sheets

(51) Int. Cl.
   *H04W 12/12*   (2009.01)
   *G06Q 20/32*   (2012.01)
   *G06Q 20/38*   (2012.01)
   *H04L 9/00*    (2006.01)
   *H04L 9/12*    (2006.01)
   *H04L 9/14*    (2006.01)
   *H04W 12/04*   (2009.01)
   *H04W 12/10*   (2009.01)

(52) U.S. Cl.
   CPC ........... *G06Q 20/382* (2013.01); *H04L 9/002* (2013.01); *H04L 9/12* (2013.01); *H04L 9/14* (2013.01); *H04L 63/061* (2013.01); *H04L 63/0869* (2013.01); *H04L 63/1441* (2013.01); *H04W 12/02* (2013.01); *H04W 12/04* (2013.01); *H04W 12/12* (2013.01); *H04L 63/12* (2013.01); *H04L 2463/121* (2013.01); *H04W 12/10* (2013.01)

(56) References Cited

U.S. PATENT DOCUMENTS

| | | | | |
|---|---|---|---|---|
| 8,300,609 | B2* | 10/2012 | Thoukydides | H04J 3/0658 370/336 |
| 8,644,352 | B1* | 2/2014 | Hutchison | H04J 3/065 370/509 |
| 2001/0008530 | A1* | 7/2001 | Okamoto | H04L 45/7453 370/428 |
| 2004/0015705 | A1 | 1/2004 | Guerin et al. | |
| 2013/0246801 | A1 | 9/2013 | Takahashi | |
| 2017/0257902 | A1* | 9/2017 | Xing | H04W 76/15 |

\* cited by examiner

METHOD FOR TRANSMITTING ENCRYPTED DATA, METHOD FOR RECEIVING, CORRESPONDING DEVICES AND COMPUTER PROGRAMS

1. FIELD OF THE INVENTION

The invention relates to the field of contactless payment. The invention relates more particularly to the field of data transmission between a user terminal, such as a portable telephone, and a payment terminal in order to make a contactless payment.

2. PRIOR ART

Contactless payment comprises a set of techniques enabling users to make payment without having to insert a payment card (a smart card or a magnetic card) into a payment terminal. Typically, contactless payment can take two forms: in a first form, a contactless payment card is used. To make a payment, the contactless card is presented in proximity to a contactless reader present in the payment terminal. Depending on the systems, the payment can additionally require the entry of a confidential code by the user.

In a second form, a mobile terminal is used instead of the contactless card. Such a mobile terminal comprises for example an NFC module and/or a GPRS module and/or a Bluetooth module. The appropriate module is used to transmit the information to the payment terminal. Typically, the information transmitted by the user's terminal to the payment terminal is of the same nature as the information transmitted by the contactless card. It can for example be a digital wallet identifier and a payment service provider identifier. Thus, at least one identifier is transmitted by the user's terminal to the payment terminal. As an alternative, this identifier can also be transmitted by a complementary communications module attached to the user's terminal. In this case, the transmitted information can be transmitted by this complementary communications module and not by the user's terminal itself.

Be that as it may, a piece of identifying information is transmitted to the payment terminal. It is important that this piece of identifying information, also called an identifier, should be secured prior to its transmission to the payment terminal. To this end, there are numerous solutions for encrypting information before it is transmitted. For example, one encryption principle based on asymmetrical keys can be applied with a preliminary exchange of keys. The method of encryption used depends actually on several factors: it is thus not easy to plan for dynamic encryption when a contactless card is used because the processor embedded in this card (when there is such a processor) does not possess sufficient computing capacity to carry out such encryption. Dynamic encryption is more appropriate when the identifier is transmitted from a mobile terminal which for its part has greater processing resources.

However, the techniques used to encrypt the data transmitted from the user's terminal to the payment terminal have a securitization defect. For example, it is possible in theory to install a device for recording information transmitted by the user's terminal without the merchant's knowledge.

The information transmitted by the user's terminal is recorded in a "spy" or "bugging" device. Although this information is encrypted, it is quite possible to envisage the re-transmission of this information identically in a fraudulent replay. The fraudulent individual who has taken care to record the encrypted information transmitted by the user's terminal and who possibly has taken care to identify the personal identification code entered thereafter by the user can then, in theory, subsequently replay the transaction by transmitting the pre-recorded encrypted information to a payment terminal. Naturally, this type of attack is possible when certain conditions are fulfilled, especially when the fraudulent individual is capable of identifying the encryption protocol implemented. When the encryption keys are created at the time of the transaction by a preliminary exchange of keys between the user's terminal and the payment terminal, the situation is more complicated than the one described (especially when the user's terminal has a contactless communications module available).

By contrast, when the user's terminal does not have available a contactless communications module, one technique employed instead (in order to nevertheless enable contactless payment) consists of the use of a communications module based on a modulation of a sequence of digits that is picked up by the magnetic read head of the payment terminal and interpreted by it as a "passage" of a virtual magnetic card within the payment terminal. This technique enables contactless payment with "basic" payment terminals equipped with a magnetic card reader.

For the securing of the transaction, this technique clearly gives rise to flaws which can be exploited by means of the technique referred to here above because the payment terminal is not equipped to differentiate between a fraudulent virtual card and a virtual card.

There is therefore a need to provide a method of transmission that is impervious to the flaws mentioned here above.

SUMMARY

The proposed technique does not have these drawbacks of the prior art. More particularly, the proposed technique can be used to avoid a replay of preliminarily transmitted data while at the same time not requiring any preliminary exchange of keys. The proposed technique takes the form of a method for transmitting data from a first terminal, called a sender terminal, to a second terminal, called a receiver terminal. Such a method comprises:
  a step for obtaining a piece of current time data;
  a step for determining a piece of transmission time data as a function of the piece of current time data and at least one predetermined parameter;
  a step for obtaining a piece of data to be encrypted from at least one piece of data to be transmitted and said at least one piece of current time data;
  a step for encrypting, by means of an encryption key, said preliminarily obtained piece of data to be encrypted, this step delivering a piece of encrypted data;
  a step for transmitting said encrypted data as a function of said piece of transmission time data.

Thus, the integration of a piece of transmission time data within the data to be encrypted enables the introduction of an anti-replay element that is difficult enough to counteract, thus significantly increasing the security level of the transmission.

According to one particular characteristic, the step for determining the piece of transmission time data comprises a step for adding a duration defined by the predetermined parameter to the piece of current time data.

Thus, by adding a duration which may be variable and which depends on the transmission parameter, it is ensured that, even in the event of interception, the encrypted data cannot be replayed because it will be necessarily replayed after the date and time at which the piece of data was sent.

According to one particular characteristic, the step for obtaining the piece of data to be encrypted comprises a step of concatenation of said at least one piece of data to be transmitted and said at least one piece of current time data.

Thus, it is simple to obtain the piece of data to be encrypted.

According to one particular characteristic, the step for transmitting said piece of encrypted data as a function of said piece of transmission time data comprises a step for putting the transmission on hold until a time that is appreciably close to the piece of transmission time data and when this time is reached, a step for transmitting said piece of encrypted data at a time that is appreciably equal to the time defined by the piece of transmission time data.

In another embodiment, the invention also relates to a device for transmitting data, the device being implemented by a first terminal called a sender terminal, to a second terminal called a receiver terminal. Such a device comprises:
  means for obtaining a piece of current time data;
  means for determining a piece of transmission time data as a function of the piece of current time data and of at least one predetermined parameter;
  means for obtaining a piece of data to be encrypted from at least one piece of data to be transmitted and from said at least one piece of current time data;
  means for encrypting said preliminarily obtained piece of data to be encrypted by means of an encryption key, delivering a piece of encrypted data;
  means for transmitting said piece of encrypted data as a function of said piece of transmission time data.

The invention also relates, in its version complementary to the method described here above, to a method for receiving data by means of a receiver terminal. According to the invention, such a method comprises:
  a step for receiving a piece of encrypted data by means of the receiver terminal;
  a step for obtaining an encryption key enabling the decryption of the piece of encrypted data;
  a step for decrypting the encrypted data, delivering a piece of decrypted data;
  a step for obtaining, from the decrypted data, a piece of received data and a piece of transmission time data;
  a step for validating the piece of received data as a function of the piece of transmission time data and of a piece of current time data of said receiver terminal.

According to one particular characteristic, the step for validating the piece of received data comprises:
  a step for comparing the piece of transmission time data and the piece of current time data of said receiver terminal as a function of a predetermined comparison parameter; and
  when the difference between the piece of transmission time data and the piece of current time data exceeds the predetermined comparison parameter, a step for rejecting the piece of received data;
  when the difference between the transmission time data and the piece of current time data is smaller than the predetermined comparison parameter, a step for accepting the piece of received data.

Thus, the proposed method ensures that if there is an attempt to replay a piece of fraudulently acquired encrypted data, then this piece of data will be rejected.

The invention also relates to a temporal synchronization server which comprises means for implementing a process of temporal synchronization between a first terminal and a second terminal in order to make their clocks coincide.

According to a preferred implementation, the different steps of the methods according to the invention are implemented by one or more software programs or computer programs comprising software instructions to be executed by a data processor of a relay module according to the invention and designed to command the execution of the different steps of the methods.

As a consequence, the invention also relates to a program, capable of being executed by a computer or by a data processor, this program comprising instructions to command the execution of the steps of a method as mentioned here above.

This program can use any programming language whatsoever and can take the form of a source code, object code or an intermediate code between a source code and an object code such as in a partially compiled form or any other desirable form.

The invention is also aimed at providing an information carrier readable by a data processor and comprising instructions of a program as mentioned here above.

The information carrier can be any entity or device whatsoever capable of storing the program. For example, the carrier can comprise a storage means such as a ROM, for example a CD ROM or a microelectronic circuit ROM or again a magnetic recording means, for example a floppy disk or a hard disk drive.

Again, the information carrier can be a transmissible carrier such as an electrical or optical signal which can be conveyed via an electrical or optical cable, by radio or by other means. The program according to the proposed technique can be especially uploaded to an Internet type network.

As an alternative, the information carrier can be an integrated circuit into which the program is incorporated, the circuit being adapted to executing or to being used in the execution of the method in question.

According to one embodiment, the proposed technique is implemented by means of software and/or hardware components. In this respect, the term "module" can correspond in this document equally well to a software component and to a hardware component or to a set of hardware and software components A software component corresponds to one or more computer programs, one or more sub-programs of a program or more generally to any element of a program or of a piece of software capable of implementing a function or a set of functions as described here above for the module concerned. Such a software component is executed by a data processor of a physical entity (terminal, server, gateway, router, etc) and is capable of accessing hardware resources of this physical entity (memories, recording media, communications buses, input/output electronic boards, user interfaces, etc).

In the same way, a hardware component corresponds to any element of a hardware unit capable of implementing a function or a set of functions as described here above for the module concerned. It can be a programmable hardware component or a component with an integrated processor for the execution of software, for example an integrated circuit, a smartcard, a memory card, an electronic board for the execution of firmware, etc.

Each component of the previously described system naturally implements its own software modules.

The different embodiments mentioned here above can be combined with one another to implement the proposed technique

4. LIST OF FIGURES

Other features and advantages of the proposed technique shall appear more clearly from the following description of a preferred embodiment, given by way of a simple illustratory and non-exhaustive example and from the appended drawings, of which:

Figure 3:
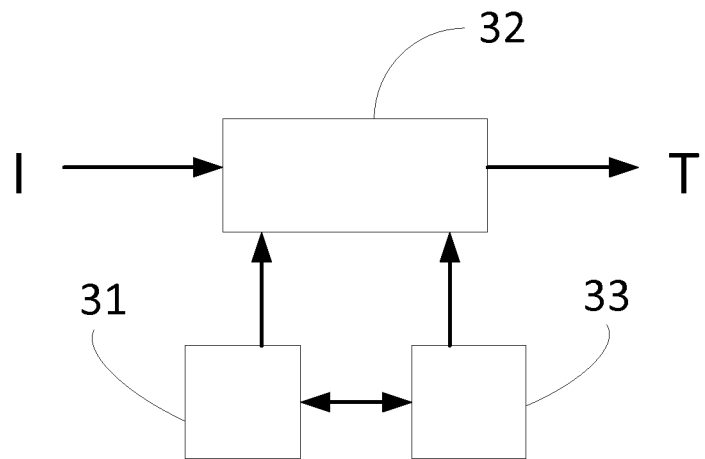
Figure 4:
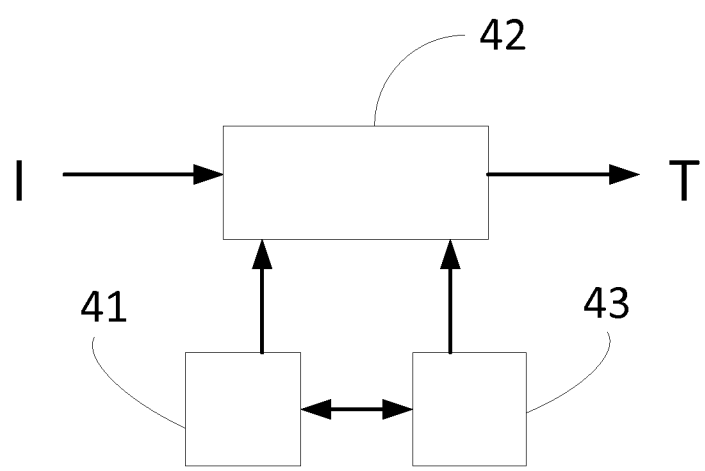

FIG. 3 describes the device for implementing the proposed technique for transmitting data;

FIG. 4 describes a device for implementing the proposed technique for receiving and validating data.

5. DESCRIPTION

5.1 Reminder of the General Principle of the Invention

Figure 1:
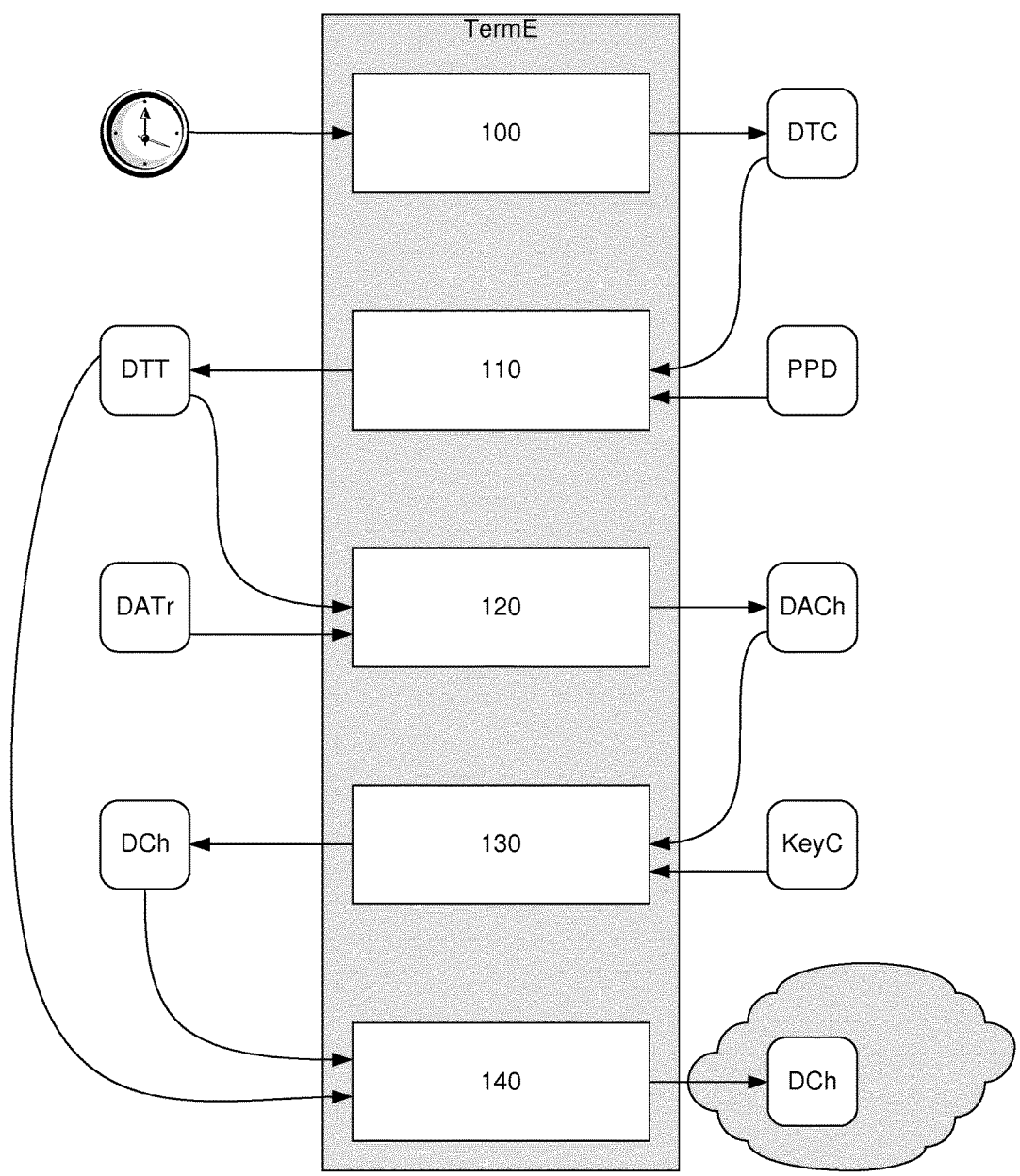
FIG. 1 is a block diagram of the proposed technique for transmitting data.
Figure 2:
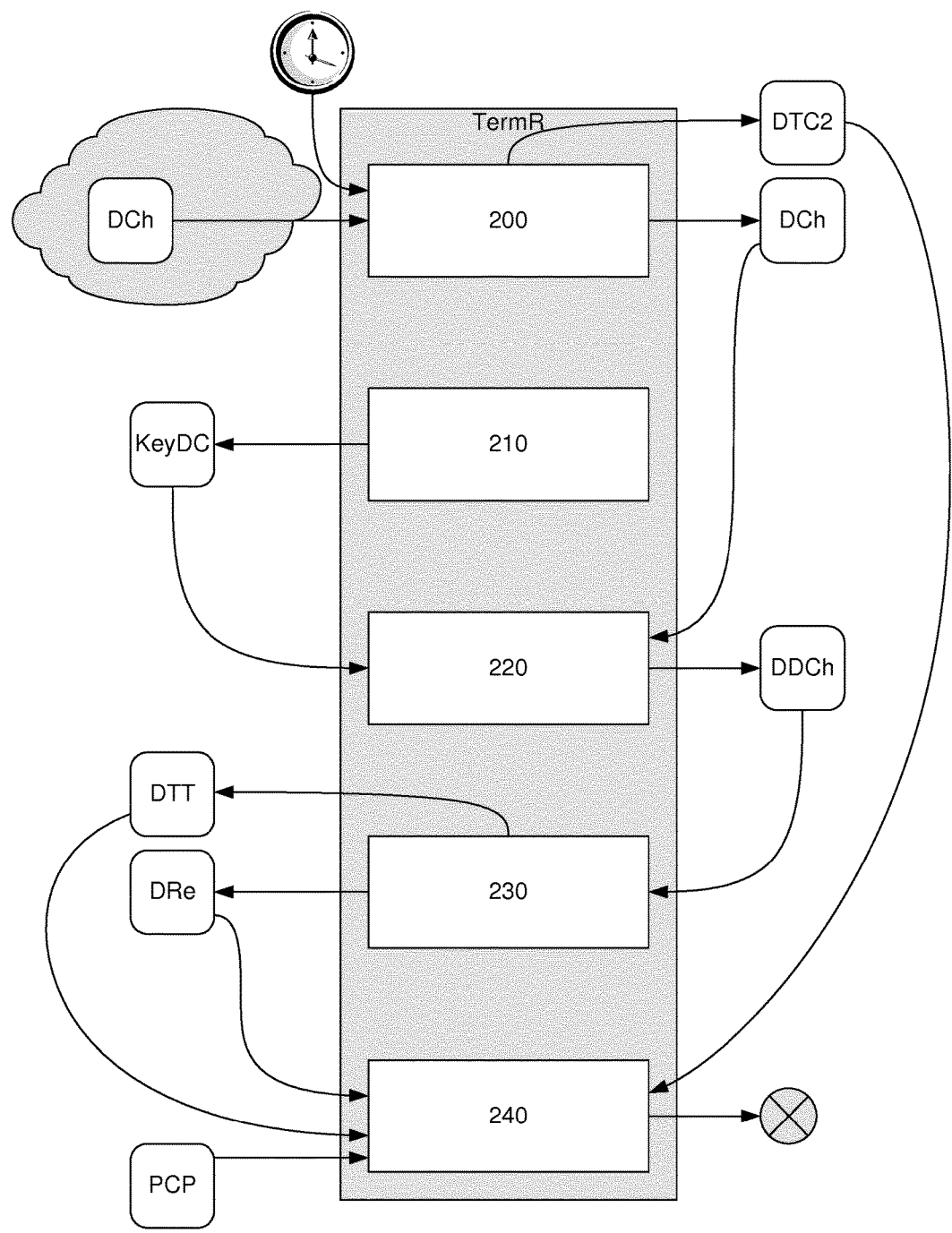
FIG. 2 is a block diagram of the proposed technique for receiving data.

The general principle of the proposed invention is presented with reference to the FIGS. 1 and 2. As explained here above, the general principle of the proposed technique consists of the transmission, at a given point in time, i.e. at a point in time defined by the piece of transmission time data (DTT), of a piece of encrypted data (DCh), this piece of encrypted data (DCh) being the resultant of an operation of encryption, with a given encryption key, on a piece of data to be encrypted. The piece of data to be encrypted for its part is the resultant of an operation carried out by means of a piece of secret data (which is typically a bank identifier or a wallet identifier or an identifier of an account with a payment services provider) and a piece of transmission time data (DTT).

In one particular embodiment, the piece of transmission time data (DTT) takes the form of a timestamp or a piece of data representing a date and a time (for example an integer on 32 or 64 bits).

A major characteristic of the technique described consists of the transmission of the piece of encrypted data (DCh) as a function of the piece of transmission time data (DTT) itself. Thus, in the proposed technique, the piece of transmission time data (DTT) is used both to encrypt the piece of secret data and to carry out the transmission of this piece of encrypted data (DCh). This is truly an advantage since the proposed technique thus ensures that it is not possible to replay the piece of encrypted data (DCh).

The general principle of the proposed technique therefore consists in implementing the following steps:

a step (100) for obtaining a piece of current time data (DTC); it is obtained on the sender terminal (TermE) (for example the user's communications terminal);

a step (110) for determining a piece of transmission time data (DTT) as a function of the piece of current time data (DTC) and at least one predetermined parameter (PPD); the predetermined parameter is used to carry out an operation on the piece of current time data (DTC); this predetermined parameter can be adaptable over time. This means that this parameter can vary in the course of time and that the value of this parameter at an instant 't' can be different from the value of this parameter at an instant 't+1';

a step (120) for obtaining a piece of data to be encrypted (DaCh) from at least one piece of data to be transmitted (DaTr) (this is the piece of secret data, for example the identifier) and the piece of transmission time data (DTT);

a step (130) for encrypting, by means of an encryption key (KeyC), said piece of preliminarily obtained data to be encrypted (DaCh) delivering a piece of encrypted data (DCh); this step for encrypting implements an encryption key which depends, naturally, on the payment service provider (bank, service provider, etc.) and the encryption key can for example be available within a secured container installed within the sender terminal, by means of a corresponding application such as an application for the management of electronic wallets;

a step (140) for transmitting said piece of encrypted data (DCh) as a function of said piece of transmission time data (DTT): once the piece of encrypted data (DCh) has been obtained, it is transmitted according to the piece of transmission time data (DTT).

Thus, it is ensured that it will not be possible to carry out a replay of the piece of encrypted data (DCh) that has been fraudulently captured because this piece of encrypted data depends on the transmission time data (DTT). More particularly, in one particular embodiment, the piece of transmission time data (DTT) is used at the reception of the piece of encrypted data (DCh) by the receiver terminal (TermR) (for example the payment terminal).

On the receiver terminal (TermR) side, the general principle of the proposed technique consists in implementing the following steps:

receiving (200) the piece of encrypted data (DCh) by means of the receiver terminal (TermR). The time at which this piece of encrypted data is received is called a piece of current time data and is kept (DTC2);

obtaining (210) an encryption key (KeyDC) used to decrypt the piece of encrypted data (DCh);

decrypting (220) the piece of encrypted data (DCh), delivering the piece of decrypted data (DDCh) (the one that has been encrypted by the sender terminal). This decryption is done by means of the key, KeyDC;

obtaining (230), from the piece of encrypted data (DDCh), the piece of received data (DRe) (N identification data) and the piece of transmission time data (DTT) by carrying out an operation that is the reverse of the one performed by the sender terminal (TermE);

validating (240) the piece of received data (DRe) as a function of the piece of transmission time data (DTT) and the piece of current time data (DTC2) of said receiver terminal (TermR).

When the piece of transmission time data (DTT) and the piece of current time data (DTC) diverge from a predetermined control parameter (PCP), the piece of received data (DRe) is rejected by the receiver terminal (TermR).

Thus, it is ensured that it is not possible to carry out a replay of the transaction by the re-transmission of a piece of encrypted data (DCh) which would be captured fraudulently.

Naturally, the embodiments of the invention can be ingeniously be deduced from the general described herein. More particularly, it is possible to carry out a preliminary calibration of the terminals (sender terminal, receiver terminal (TermR)). In one specific embodiment of the invention, the sender terminal (TermE) gets calibrated on the receiver terminal (TermR) in order to carry out a clock synchronization. In one particular embodiment, this synchronization is done simply by the sender terminal (TermE) by reading and decoding a piece of information representing a synchronization time displayed on the receiver terminal (TermR), for example by means of a screen of the receiver terminal (TermR), prior to the implementing of the transaction between the sender terminal (TermE) and the receiver terminal (TermR).

In another embodiment, the synchronization is done for example by a management application installed on the sender terminal (TermE) which links up to a particular temporal server in order to obtain a time synchronized with that of the receiver terminal (TermR).

Although it is not obligatory, this phase of preliminary synchronization by means of a server further increases the security of the proposed technique: indeed, the only unit that can be authorized to link up to a server is an identified terminal, namely a terminal that has downloaded a management application from a particular provider. This means that the phase of synchronization starts with authenticating the terminal and therefore locating it. When the receiver terminal (TermR) receives the piece of encrypted data (DCh) transmitted by the sender terminal, on the one hand it is ensured that the two clocks are synchronized. On the other hand, and complementarily, the receiver terminal (TermR) can retrieve the location of the sender terminal (TermE) also by an access to the same synchronization server. When the location delivered by the synchronization server diverges from the location of the receiver terminal (TermR), this terminal can then refuse the piece of identification data N which has been transmitted to it. The term "location" is understood for example to mean an identifier of a base station to which the sender terminal (TermE) can be connected.

Here below, we describe a simple embodiment of the proposed technique. This embodiment is particularly suited to an implementation of a contactless payment made between a user's communications terminal (such as a smartphone or an accessory connected to this smartphone) and a payment terminal comprising a magnetic read head. The user's terminal (or his connected accessory) simulates the presence of a magnetic card. To prevent fraud, the user's connection terminal and the payment terminal implement the technique described here above.

5.2 Description of One Embodiment

In this embodiment, it is assumed that the internal clocks of the payment terminal and of the user's terminal are synchronized. This embodiment uses the principle of this synchronization to implement the proposed technique. This synchronization however is not obligatory. It is indeed possible to implement the proposed technique without synchronization. Simple knowledge by the user's terminal of a time lag between its clock and the clock of the payment terminal is sufficient to implement this technique.

In this embodiment, the piece of current time data (DTC) is a timestamp. This timestamp is obtained from the clock of the terminal by a simple function call.

Here, therefore, the payment terminal and the user's communications terminal are synchronized clocks. The possessor of the communications terminal wishes to make a contactless purchase by simulating the presence of a magnetic payment card. A transaction is therefore initialized on the payment terminal side.

To send the credit card number N (data to be transmitted), the communications terminal obtains the current date and time (current time data (DTC)). The terminal then adds a short time to this current time data (DTC) (typically one to two seconds t) defined by a predetermined parameter (PPD), giving D'=D+t. Then, the communications terminal carries out an encryption of the following piece of information (N,D'), (concatenation of these two pieces of data) by means of an encryption key and obtains the encrypted data. It preserves this encrypted data and verifies the time that has elapsed. When the current time is substantially equal to the time D', the communications terminal transmits the piece of data thus encrypted to the payment terminal.

The payment terminal (receiver terminal), using its magnetic read head, decrypts the received data, checks that it has received the encrypted data (DCh) appreciably at the time D' and verifies that, in decrypting it, (N,D') is really there. When the expected pieces of data do not correspond to the received data, the identifier provided is not accepted and the transaction is rejected.

Thus, in this embodiment of the proposed technique, it is not possible to carry out a replay of the fraudulently captured encrypted data (DCh) because this piece of data would not correspond to the time and date of the payment terminal and therefore the payment would be rejected.

In one embodiment of the proposed technique, in a complementary and non-obligatory way, the sender terminal (which is the user's communications terminal) uses a GPRS module of the terminal and/or a Bluetooth module and/or the screen of the communications terminal to carry out the transmission of the encrypted data to the payment terminal. Indeed, the goal of this embodiment is to bring data to the magnetic head of the payment terminal in making it believe that a virtual card has been inserted. The module or modules of the user's communications terminal are therefore used to create a signal which, even if it does not perfectly imitate an F2F magnetic card encoding, is capable of being picked up by the magnetic head of the payment terminal.

This mode of transmission depends on the GPRS and Bluetooth modules present on board mobile phones.

In one embodiment of the proposed technique, in a complementary and non-obligatory way, the sender terminal (which is the user's communications terminal) is connected to a complementary device in the user's possession. In this embodiment, it is the complementary device that implements the method of encryption and/or transmission of the encrypted data to the payment terminal by means of an appropriate transmission module.

In one embodiment of the proposed technique, in a complementary and non-obligatory way, the complementary device in the user's possession is connected to an audio jack connector of the user's communications terminal. The communications terminal therefore transmits data to the device in using this interface. In this embodiment, it also receives a data from this device in using the same interface (but in using the microphone jack ring).

Thus, the mobile device can, at one and the same time, send a signal (in modulating a "sound" in a coil) but also hear a sound modulated either by the exterior through its microphone or more ingeniously, directly through the jack connector. The result of this is a short-range accessory by which a piece of information can be sent from terminal to terminal over a small distance.

5.3 Others Features and Advantages

Referring to FIG. 3, we describe a sender terminal (TermE) implemented to carry out the transactions according to the method described here above.

For example, the terminal comprises a memory 31 constituted by a buffer memory, a processing unit 32 equipped for example with a microprocessor and driven by the computer program 33 implementing a method for encrypting and transmitting data.

At initialization, the code instructions of the computer program 33 are for example loaded into a RAM of the device 10 and then executed by the processing unit 32. The processing unit 32 inputs at least one piece of data representing an identifier and one piece of data representing a current time. The microprocessor of the processing unit 32 implements the steps of the method of encryption and transmission, according to the instructions of the computer program 33.

To this end, the intermediate device 10 comprises, in addition to the buffer memory 31, communications means such as network communications modules, data transmission means and, if necessary, a processor dedicated to encryption.

In one particular embodiment of the invention, the sender terminal (TermE) which can be a smartphone, a tablet, a laptop, a PDA integrates means of encryption and transmission as described here above. These means can take the form of a special processor implemented within the terminal, said processor being a secured processor. According to one particular embodiment, this terminal implements a particular application which is in charge of managing the encryption and transmission, this application being for example provided by the manufacturer of the processor in question in order to enable the use of said processor. To this end, the processor comprises unique identification means. These unique identification means ensure the authenticity of the processor.

In another embodiment, the management application installed in the terminal also comprises unique identification means making it possible either to ensure the authenticity of the application or to ensure the identification of the carrier of the terminal, or to fulfill both of these functions.

Referring to FIG. 4, a receiver terminal (TermR) is described. This terminal is implemented to receive and decode the encrypted data, from the viewpoint of the receiver terminal (TermR), according to the method described here above.

For example, the terminal comprises a memory 41 constituted by a buffer memory, a processing unit 42 equipped for example with a microprocessor and driven by the computer program 43 implementing a method for receiving and decrypting data received from another terminal.

At initialization, the code instructions of the computer program 33 are for example loaded into a RAM of the device 10 and then executed by the processing unit 42. The processing unit 42 input at least one piece of encrypted data. The microprocessor of the processing unit 42 implements the steps of the method for processing received encrypted data, according to the instructions of the computer program 43.

To this end, the receiver terminal (TermR) comprises, in addition to the buffer memory 41, communications means such as network communications modules, data transmission means and, if necessary, an encryption processor.

These means can take the form of a special processor implemented within the receiver terminal (TermR), said processor being a secured processor. According to one particular embodiment, this receiver terminal (TermR) implements a particular application which is in charge of receiving and decoding data, this application being provided for example by the manufacturer of the processor in question in order to enable the use of said processor. To this end, the processor comprises unique identification means. These unique identification means are used to ensure the authenticity of the processor.

Besides, the receiver terminal (TermR) furthermore comprises means for obtaining the piece of identification data N and the piece of transmission time data (DTT) from the piece of data to be encrypted, by carrying out an operation that is the reverse of the operation carried out by the sender terminal. (TermE). The receiver terminal (TermR) also comprises means for validating the piece of identification data N as a function of the piece of transmission time data (DTT) and a piece of current time data (DTC) of said receiver terminal (TermR). These means also take the form of communications interfaces enabling the exchange of data on communications networks, means for interrogating and updating data bases, means for comparing location data.

The invention claimed is:

1. A method of transmitting data from a first terminal, called a sender terminal, to a second terminal, called a receiver terminal, wherein the method comprises:
   obtaining a piece of current time data;
   determining a piece of transmission time data as a function of the piece of current time data and at least one predetermined parameter comprising a duration to be added to the piece of current time data to obtain the piece of transmission time data;
   obtaining a piece of data to be encrypted from a concatenation of at least one piece of data to be transmitted and at least one piece of transmission time data;
   encrypting, by means of an encryption key, said preliminarily obtained piece of data to be encrypted to generate a piece of encrypted data;
   transmitting said piece of encrypted data at a point in time defined by said piece of transmission time data.

2. The method according to claim 1, wherein the step for transmitting said piece of encrypted data comprises putting the transmission on hold until a time that is substantially close to the piece of transmission time data and when this time is reached, transmitting said piece of encrypted data at a time that is substantially equal to the time defined by the piece of transmission time data.

3. A device for transmitting data implemented by a first terminal, called a sender terminal, to a second terminal called a receiver terminal, wherein the device comprises:
   at least one communication interface;
   a memory;
   at least one processing unit connected to the at least one communication interface and to the memory for transmitting data to the receiver terminal; and
   a non-transitory computer-readable medium comprising instructions stored thereon, which when executed by the processing unit configure the device to perform acts comprising:
   obtaining a piece of current time data;
   determining a piece of transmission time data as a function of the piece of current time data and of at least one predetermined parameter comprising a duration to be added to the piece of current time data to obtain the piece of transmission time data;
   obtaining a piece of data to be encrypted from a concatenation of at least one piece of data to be transmitted and said at least one piece of transmission time data;
   encrypting said preliminarily obtained piece of data to be encrypted by means of an encryption key, delivering a piece of encrypted data; and
   transmitting said piece of encrypted data at a point in time defined by said piece of transmission time data.

4. A non-transitory computer-readable medium comprising a computer program product stored thereon which comprises program code instructions to execute a method of transmitting data from a first terminal, called a sender terminal, to a second terminal, called a receiver terminal, when the instructions are executed by a processor of a device for transmitting data implemented by said first terminal, wherein the method comprises:

obtaining a piece of current time data;

determining a piece of transmission time data as a function of the piece of current time data and at least one predetermined parameter comprising a duration to be added to the piece of current time data to obtain the piece of transmission time data;

obtaining a piece of data to be encrypted from a concatenation of at least one piece of data to be transmitted and at least one piece of transmission time data;

encrypting, by means of an encryption key, said preliminarily obtained piece of data to be encrypted to generate a piece of encrypted data; and transmitting said piece of encrypted data at a point in time defined by said piece of transmission time data.

5. A method of receiving data from a first terminal, called a sender terminal, by means of a second terminal, called a receiver terminal, the data being transmitted by implementing a method of transmitting according to claim 1, wherein the method of receiving comprises:

receiving a piece of encrypted data by means of the receiver terminal;

obtaining an encryption key enabling the decryption of the piece of encrypted data;

decrypting the piece of encrypted data, delivering a piece of decrypted data;

obtaining, from the decrypted data, a piece of received data and a piece of transmission time data; and validating the piece of received data as a function of the piece of transmission time data and of a piece of current time data of said receiver terminal.

6. The method according to claim 5, wherein the step for validating the piece of received data comprises:

comparing the piece of transmission time data and the piece of current time data of said receiver terminal as a function of a predetermined comparison parameter; and when the difference between the piece of transmission time data and the piece of current time data exceeds the predetermined comparison parameter, a step for rejecting the piece of received data;

when the difference between the transmission time data and the piece of current time data is smaller than the predetermined comparison parameter, a step for accepting the piece of received data.

7. A device for receiving data coming from a first terminal, called a sender terminal, the device being implemented by a second terminal, called a receiver terminal (Term R), wherein the device comprises:

at least one communication interface;

a memory;

at least one processing unit connected to the at least one communication interface and to the memory for receiving data from the sender terminal according to claim 5; and a non-transitory computer-readable medium comprising instructions stored thereon, which when executed by the processing unit configure the device to perform acts comprising:

receiving a piece of encrypted data by means of the receiver terminal;

obtaining an encryption key enabling the decryption of the piece of encrypted data;

decrypting the piece of encrypted data, delivering a piece of decrypted data;

obtaining a piece of received data and a piece of transmission time data from the decrypted data; and validating the piece of received data as a function of the piece of transmission time data and of a piece of current time data of said receiver terminal.

8. A non-transitory computer-readable medium comprising a computer program product stored thereon which comprises program code instructions to execute a method of receiving data from a first terminal, called a sender terminal, to a second terminal, called a receiver terminal, said data being transmitted according to claim 4, when the instructions are executed by a processor of a device for transmitting data implemented by said first terminal wherein the method comprises:

receiving a piece of encrypted data by means of the receiver terminal;

obtaining an encryption key enabling the decryption of the piece of encrypted data;

decrypting the piece of encrypted data, delivering a piece of decrypted data;

obtaining, from the decrypted data, a piece of received data and a piece of transmission time data; and validating the piece of received data as a function of the piece of transmission time data and of a piece of current time data of said receiver terminal.

* * * * *